(12) United States Patent
Ohtomo

(10) Patent No.: US 8,036,828 B2
(45) Date of Patent: Oct. 11, 2011

(54) VEHICLE BRAKING CONTROL DEVICE

(75) Inventor: Yosuke Ohtomo, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1127 days.

(21) Appl. No.: 11/822,658

(22) Filed: Jul. 9, 2007

(65) Prior Publication Data

US 2008/0021625 A1 Jan. 24, 2008

(30) Foreign Application Priority Data

Jul. 19, 2006 (JP) ................................. 2006-197386

(51) Int. Cl.
G08G 1/16 (2006.01)
(52) U.S. Cl. ............................. 701/301; 701/70; 701/96
(58) Field of Classification Search .................. 180/169; 303/192; 701/70, 96, 301; 73/126
See application file for complete search history.

(56) References Cited

U.S. PATENT DOCUMENTS

| | | | | |
|---|---|---|---|---|
| 5,173,859 | A * | 12/1992 | Deering ........................... | 701/70 |
| 5,984,435 | A * | 11/1999 | Tsukamoto et al. ........... | 303/191 |
| 6,169,478 | B1 * | 1/2001 | Hada et al. ..................... | 340/435 |
| 6,292,753 | B1 * | 9/2001 | Sugimoto et al. ............. | 701/301 |
| 6,984,435 | B2 * | 1/2006 | Kobayashi et al. ............ | 428/141 |
| 2005/0123173 | A1 * | 6/2005 | Isaji et al. ...................... | 382/104 |

FOREIGN PATENT DOCUMENTS

JP 2004-256104 9/2004

* cited by examiner

*Primary Examiner* — Khoi Tran
*Assistant Examiner* — Stephen Holwerda
(74) *Attorney, Agent, or Firm* — Smith, Gambrell & Russell, LLP

(57) ABSTRACT

A control unit extracts stop position candidates P1 to Pn from the white line data and three-dimensional object data recognized and acquires their positions L1 to Ln, and sets, as a target stop position Lt, one of the stop position candidates P1 to Pn that is the closest to the braking distance Lb obtained based on the current braking operation quantity θp and vehicle speed V. The control unit subtracts a learning value LL from the target stop position Lt to calculate a corrected target stop position Ltc and sets a corrected braking operation quantity value θpc based on the corrected target stop position Ltc and vehicle speed V. When the absolute value |θp−θpc| of the difference between the braking operation quantity θp and the corrected braking operation quantity value θpc is within a preset range, the control unit executes braking control based on the corrected braking operation quantity value θpc.

5 Claims, 4 Drawing Sheets

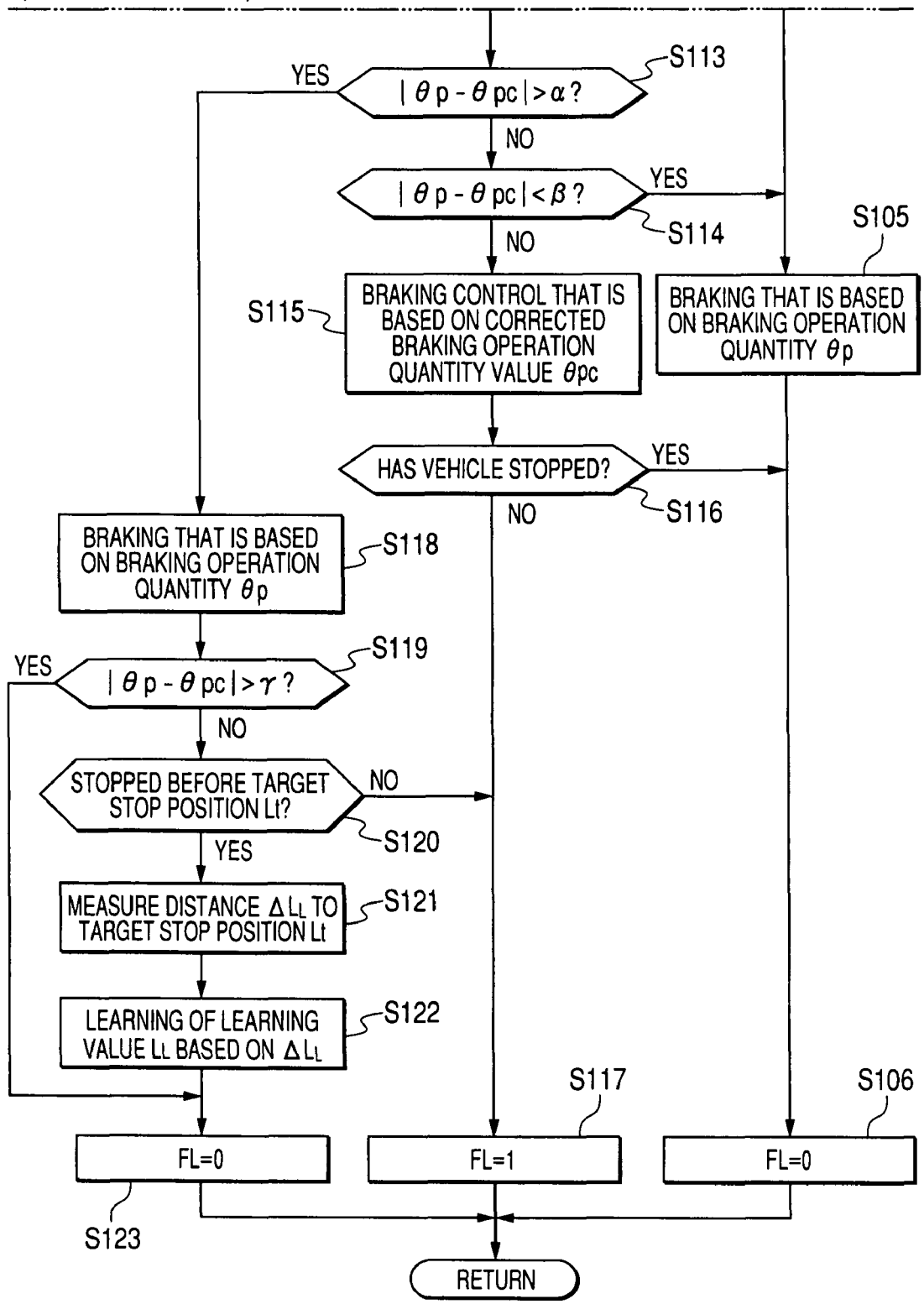

VEHICLE BRAKING CONTROL DEVICE

CROSS-REFERENCE TO RELATED APPLICATIONS

The disclosure of Japanese Patent Application No. 2006-197386 filed on Jul. 19, 2006 including the specification, drawings and abstract is incorporated herein by reference in its entirety.

BACKGROUND OF THE INVENTION

1. Field of the Invention

The present invention relates to a vehicle braking control device for assisting smooth braking by a driver.

2. Related Art

In recent years, braking control devices have been proposed for assisting braking by a driver in a variety of ways.

For example, Japanese Patent Unexamined Application JP-A-2004-256104 discloses a braking control system for calculating a correction factor in accordance with the distance to an obstacle ahead, distance to a car running ahead or a road gradient and correcting the braking operation quantity of a driver by using the correction factor. According to this system, it is possible to obtain a same braking distance with the same amount of stepping on a brake pedal in the braking while driving down hills.

When a driver stops his/her vehicle by way of braking, in case the brake pedal operation is insufficient for a target stop position, the vehicle stops beyond the target position. In case the brake pedal is stepped on excessively, the vehicle stops before the target position. The driver attempts to adjust the brake pedal operation quantity to stop the vehicle at the target position. In this operation, a change in the degree of deceleration gives a passenger a sense of discomfort. The system just provides the same braking distance corresponding to the same brake pedal operation. This does not assist the driver to eliminate the sense of discomfort caused on the passenger due to a change in the degree of deceleration.

SUMMARY OF THE INVENTION

One or more embodiments of the invention provide a vehicle braking control device that stops a vehicle smoothly at a predetermined target stop position without unnecessary acceleration/deceleration or discomfort on a passenger despite an unnecessary braking by a driver to stop the vehicle at the target position.

In accordance with one or more embodiments of the invention, a vehicle braking control device is provided with: stop position candidate recognition means for recognizing a stop position candidate for a vehicle stop position; braking operation quantity detection means for detecting a braking operation quantity; vehicle speed detection means for detecting a vehicle speed; target stop position setting means for setting a target stop position to stop a vehicle based on the stop position candidate, braking operation quantity and vehicle speed; braking control quantity setting means for setting a braking control quantity to stop the vehicle based on the target stop position and vehicle speed; and braking control execution means for executing braking control based on the braking control quantity in case the braking operation quantity is a value in an area preset with respect to the braking control quantity.

According to the vehicle braking control device of one or more embodiments of the invention, the vehicle braking control device stops a vehicle smoothly at a predetermined target stop position without unnecessary acceleration/deceleration or discomfort on a passenger despite an unnecessary braking by a driver to stop the vehicle at the target position.

Other aspects and advantages of the invention will be apparent from the following description and the appended claims.

DETAILED DESCRIPTION OF THE EXEMPLARY EMBODIMENTS

An exemplary embodiment of the invention will be described based on drawings.

Figure 1:
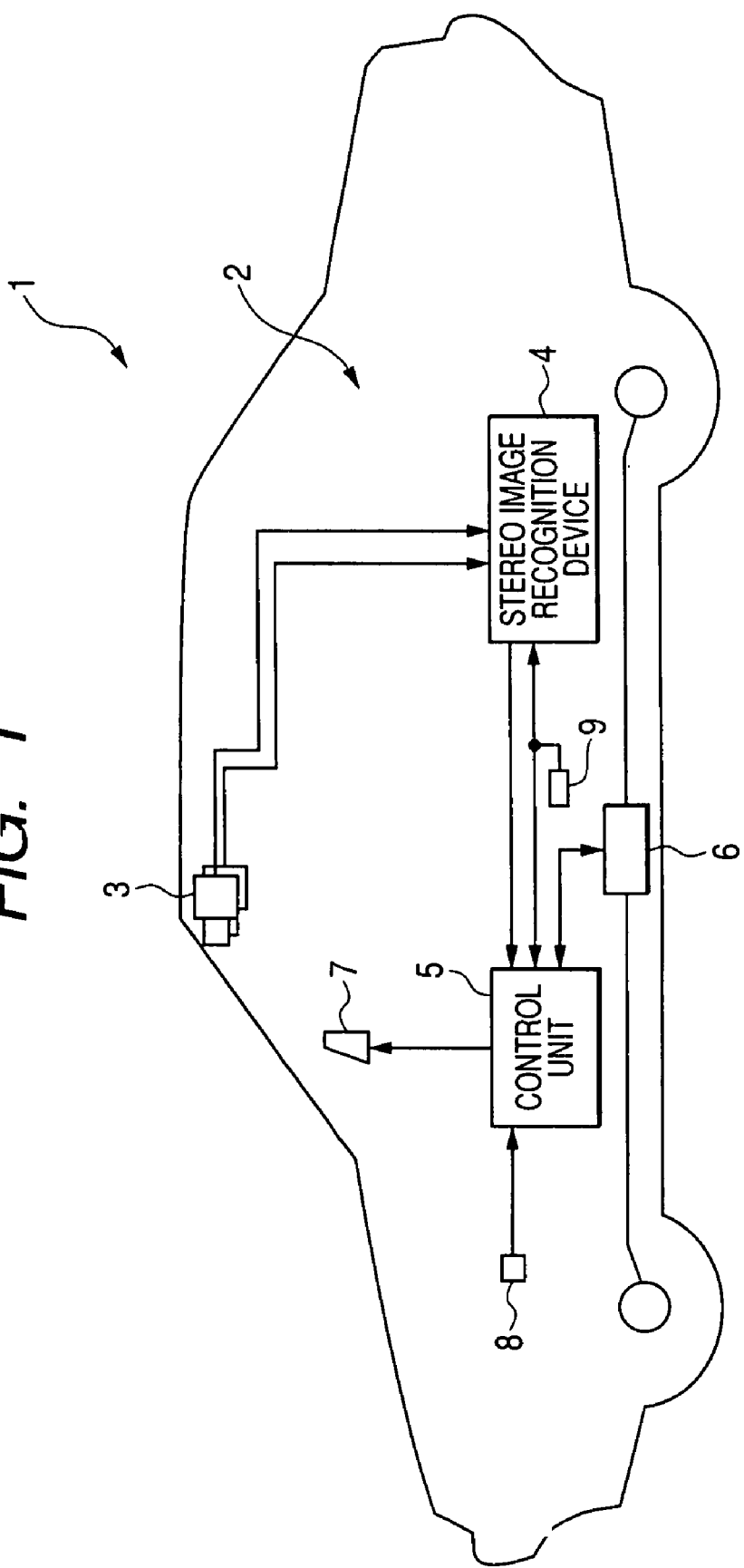
FIG. 1 is a schematic block diagram of a braking control device mounted on a vehicle.
Figure 2:
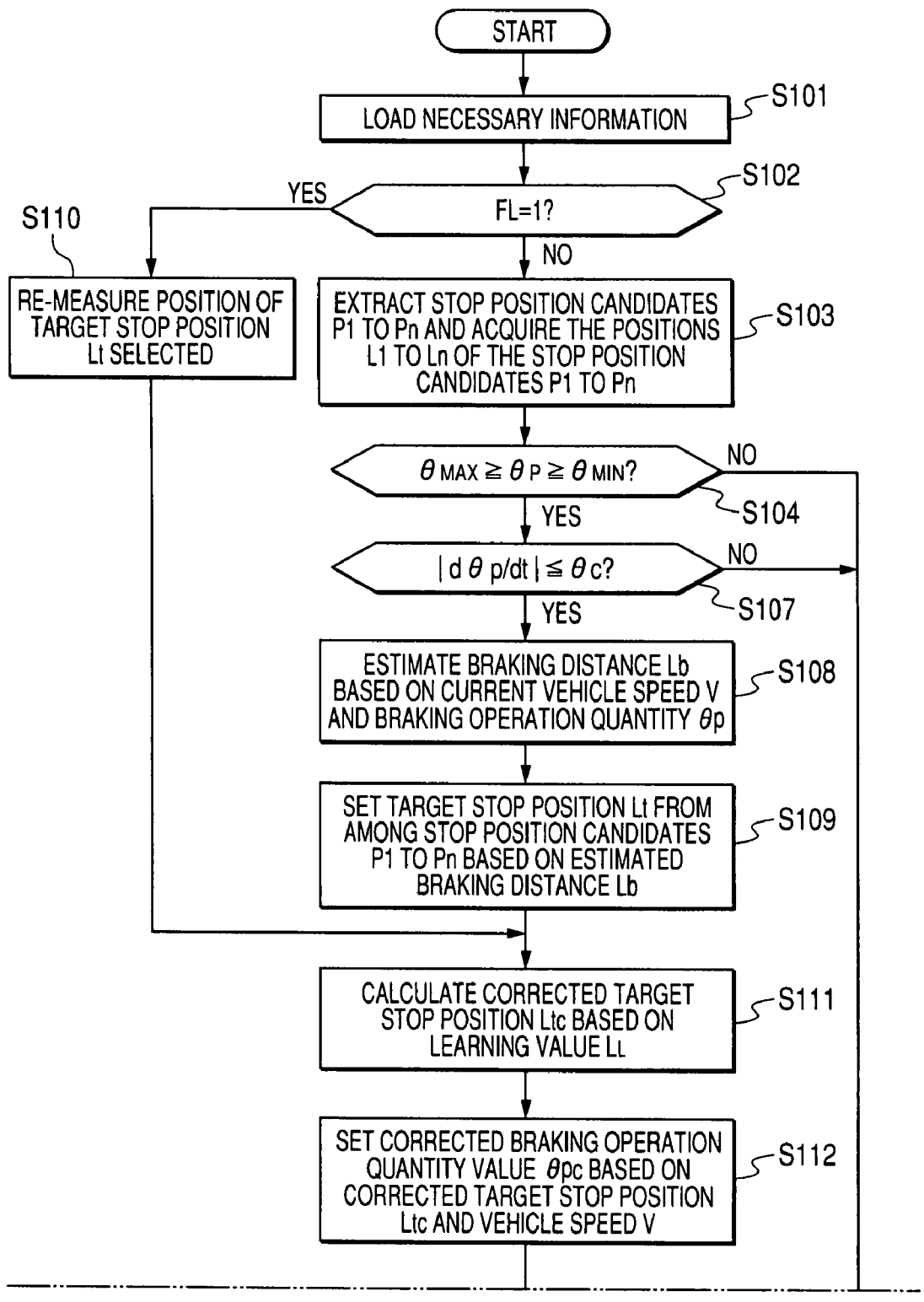
FIG. 2 is a flowchart of a braking assist control program.
Figure 3:
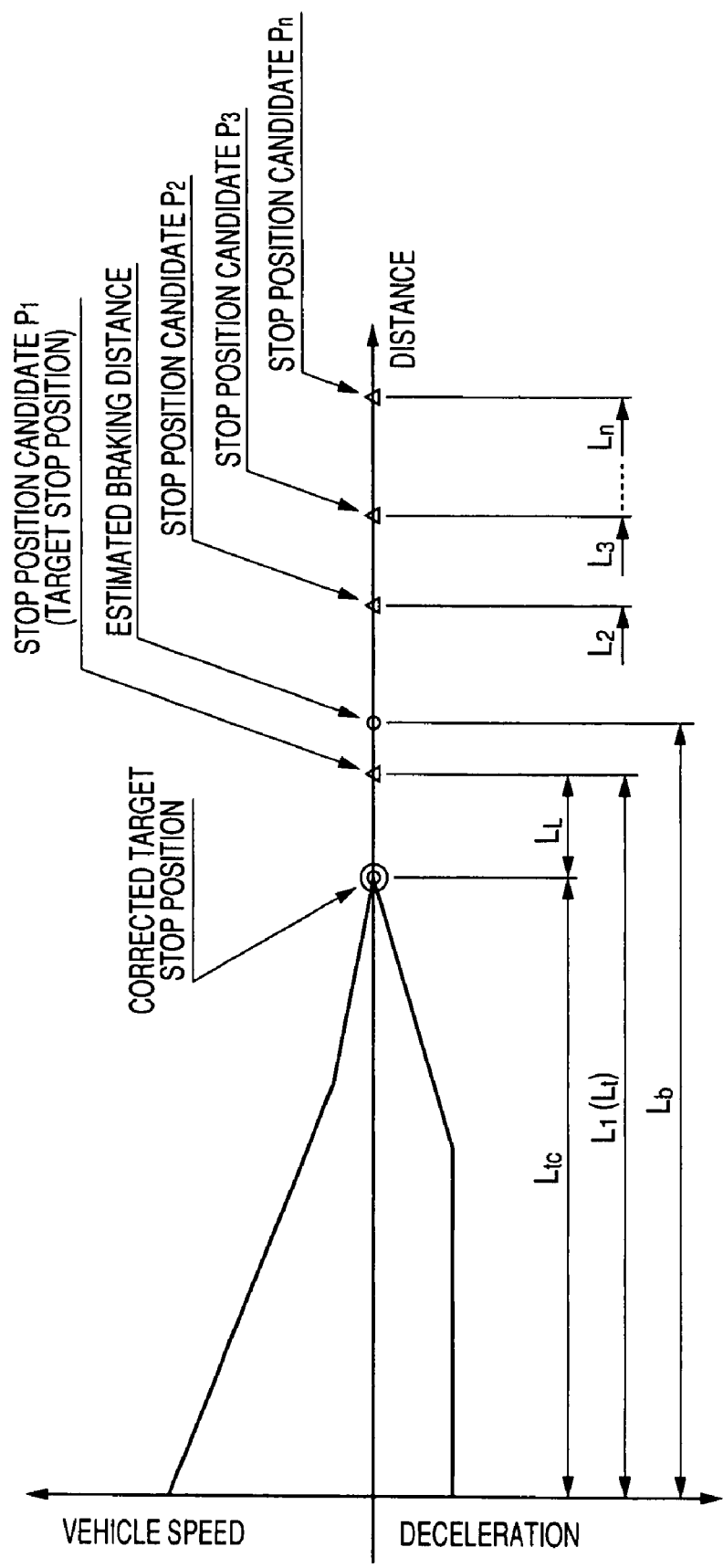
FIG. 3 illustrates parameters defined in the braking assist control.

FIGS. 1 to 3 show the exemplary embodiment of the invention.

FIG. 1 is a schematic block diagram of a braking control device mounted on a vehicle. FIG. 2 is a flowchart of a braking assist control program. FIG. 3 illustrates parameters defined in the braking assist control.

In FIG. 1, a numeral 1 represents a vehicle (own vehicle) such as an automobile. The vehicle 1 has a braking control device 2 mounted thereon for assisting the braking by a driver.

The braking control device 2 includes a stereo camera 3, a stereo image recognition device 4, and a control unit 5. The braking control device 2 is basically controlled by a braking assist control program mentioned later. In case the driver attempts to stop the vehicle at a stop position ahead by way of braking, the braking control device 2 prevents unnecessary decelerating variations caused by operation of a brake pedal. Thus, in case braking assist control is activated, a signal for braking control is outputted to a brake driving part 6. While braking assist control is activated, an LED 7 provided on an instrument panel or the like is turned on to notify the driver that braking assist control is activated.

The stereo camera 3 has a pair of (right and left) CCD cameras using a solid image pickup element such as a charge-coupled device (CCD) as a stereo optical system. The right and left CCD cameras are mounted on the front area of the ceiling in the cabin with a predetermined space apart, and performs stereoscopic imaging of a object outside the vehicle (a three-dimensional object such as a pedestrian, a car running ahead, a parked car, or an obstacle and a white line) from different viewpoints and outputs the image data to the stereo image recognition device 4.

For example, recognition processing of image data from the stereo camera 3 in the stereo image recognition device 4 is made in the following way. A pair of stereo images of the area ahead of the own vehicle 1 photographed with a pair of cameras are subjected to processing to obtain distance information based on the principle of triangulation from the amount of displacement of a corresponding position and a distance image to represent the three-dimensional distance distribution is generated. Based on this data, well-known grouping processing is made. The data is compared with windows of pre-stored three-dimensional road shape data, side wall data to extract three-dimensional object data including white line data, data of a guard rail preset along a road, side wall data such as curbstone data, and data of a vehicle and a pedestrian. Each item of white line data, side wall data and three-dimensional object data thus extracted is given a separate number. White line data and three-dimensional object data recognized by the stereo image recognition device 4 are outputted to the control unit 5 together with their distance information.

The vehicle 1 includes a brake pedal sensor 8 as braking operation quantity detection means for detecting the braking operation quantity θp of a driver and a vehicle speed sensor 9 as a vehicle speed detection means for detecting a vehicle speed V in order to perform braking assist control by way of the control unit 5. A signal from these sensors 8, 9 is inputted to the control unit 5. A signal from the vehicle speed sensor 9 is inputted to the stereo image recognition device 4 also and used in arithmetic operation of the speed information on a recognized three-dimensional object.

Next, a program of braking assist control executed by the control unit 5 will be described referring to the flowchart of FIG. 2.

In step (hereinafter abbreviated as "S") 101, necessary information is loaded. In S102, it is determined whether a braking assist control execution flag FL is 1 (control is active) or 0 (control is inactive).

In case it is determined that FL=0 and control is inactive in S102, execution proceeds to S103, where stop position candidates P1 to Pn are extracted from the white line data and three-dimensional object data recognized by the stereo image recognition device 4 and the positions L1 to Ln of the stop position candidates P1 to Pn are acquired.

In other words, a three-dimensional object present in a preset area (for example, a travel area having a width of 2 meters about a own vehicle travel path estimated in advance based on a steering wheel angle) are a white line drawn as crossing the travel area are defined as stop position candidates P1 to Pn out of the white line data and three-dimensional object data recognized by the stereo image recognition device 4 and these positions L1 to Ln are acquired (refer to FIG. 3). This processing is stop position candidate recognition means provided on the control unit 5.

Next, in S104, it is determined whether the current braking operation quantity θp is a value in a preset area, that is, whether θMAX≧θp≧θMIN.

As a result of this determination, in case it is determined that the current braking operation quantity θp is greater than θMAX (θMAX<θp), there is a possibility of hard braking by the driver. Execution proceeds to S105, where the braking with a braking operation quantity θp by the driver is accepted. In S106, it is determined that FL=0 and the program is exited.

In case it is determined that the current braking operation quantity θp is smaller than θMIN (θMIN>θp), braking by the driver is minute and the braking by the driver does not cause a problem. Execution proceeds to S105, where the braking with a braking operation quantity θp by the driver is accepted. In S106, it is determined that FL=0 and the program is exited.

In case it is determined that θMAX≧θp≧θMIN in S104, execution proceeds to S107, where it is determined whether the current braking operation quantity θp is stable, for example whether the absolute value |dθp/dt| of the differential value of the current braking operation quantity θp is equal to or smaller than the preset value θc.

As a result of this determination, in case it is determined that |dθp/dt| is greater than the preset value θc (|dθp/dt|>θc) and the current braking operation quantity θp is unstable, the braking by the driver is in the course of operation and this value is not suited for control. Execution proceeds to S105, where the braking with a braking operation quantity θp by the driver is accepted. In S106, it is determined that FL=0 and the program is exited.

As a result of determination in S107, in case it is determined that |dθp/dt|≦θc and the current braking operation quantity θp is stable, execution proceeds to S108.

In S108, a braking distance Lb is estimated based on a current vehicle speed V and a braking operation quantity θp. Arithmetic operation uses the following expression, for example.

$$Lb = -(1/2) \cdot (V^2/(k \cdot \theta p)) \quad (1)$$

where k is a factor for converting the braking operation quantity θp to a deceleration. The braking distance Lb may be obtained using a preset map instead of using Expression (1).

Next, in S109, one of the stop position candidates P1 to Pn extracted in S103 whichever is the closest to the braking distance Lb is set as a target stop position Lt and execution proceeds to S111. In the example shown in FIG. 3, the stop position candidate P1 is the closest to the braking distance Lb, so that the position L1 of the stop position candidate P1 is set as a target stop position Lt. In this way, S108 and S109 constitute target stop position setting means.

In case it is determined that FL=1 and control is active in S102, execution proceeds to S110, where the position of the selected target stop position Lt is measured again, and execution proceeds to S111.

When execution proceeds to S111 from S109 or S110, based on the target stop position Lt and a learning value LL as a correction value mentioned later, a corrected target stop position Ltc is calculated using Expression (2) shown below.

$$Ltc = Lt - LL \quad (2)$$

In S112, a corrected braking operation quantity value θpc as a braking control quantity is obtained using Expression (3) based on the corrected target stop position Ltc and the vehicle speed V.

$$\theta pc = -(1/2) \cdot (V^2/(k \cdot Ltc)) \quad (3)$$

The corrected braking operation quantity value θpc may be obtained using a preset map instead of using Expression (3). In this way, S111 and S112 constitute braking control quantity setting means.

In S113, it is determined whether the absolute value |θp−θpc| of the difference between the braking operation quantity θp and the corrected braking operation quantity value θpc is greater than a preset threshold α. In case |θp−θpc| is equal to or smaller than α (|θp−θpc|≦α), execution proceeds to S114.

In S114, it is determined whether |θp−θpc| is smaller than a preset value β. In case |θp−θpc| is equal to or greater than β (α≧|θp−θpc|≧2), execution proceeds to S115, where braking control is executed based on the corrected braking operation quantity value θpc.

In S116, it is determined whether the vehicle is stopped. In case the vehicle is stopped, execution proceeds to S106 to cancel braking assist control and it is determined that FL=0 and the program is exited. In case the vehicle is not stopped, execution proceeds to S117 to continue the control and it is determined that FL=1 and the program is exited. S113 to S115 constitute braking control execution means.

In case |θp−θpc| is smaller than β (|θp−θpc|<β) in step S114, there is no difference between the braking operation quantity θp and the corrected braking operation quantity value θpc, so that it is determined that there is no need to make particular control and the driver's braking is sufficient. Thus, execution proceeds to S105, where the braking with a braking operation quantity θp by the driver is accepted. Execution proceeds to S106, where it is determined that FL=0 and the program is exited.

In case |θp−θpc| is greater than α(|θp−θpc|>α) in step S113, it is determined that there is a substantial difference between the braking operation quantity θp and the corrected braking operation quantity value θpc for the control to be executed. Execution proceeds to S118, where braking is executed based on the driver's braking operation quantity θp.

In S119, it is determined whether |θp−θpc| is greater than a preset threshold γ. In case |θp−θpc| is greater than γ(|θp−θpc|>γ), execution proceeds to S123 to execute braking based on the driver's braking operation quantity θp and it is determined that FL=0 and the program is exited.

In case |θp−θpc| is equal to or smaller than γ (θp−θpc|≦γ), the control side is possibly unfamiliar with the driver's braking feel. Execution proceeds to S120 to S122 as processing to improve the learning value LL.

In case it is determined that |θp−θpc|≦γ in S119 and execution proceeds to S120, it is determined whether the vehicle has stopped before the target stop position Lt.

In case the vehicle has not stopped before the target stop position Lt as the result of the determination, execution proceeds to S117, where control is made assuming FL=1 and the program is exited. In case the vehicle has stopped before the target stop position Lt, execution proceeds to S121, where a distance ΔLL to the target stop position Lt is measured.

In S122, the learning value LL is subjected to learning arithmetic operation based on the distance ΔLL to the target stop position Lt (for example, weighted mean; LL=((n−1)·LL+ΔLL/n; n is the number of samples of a distance ΔLL so far). In S123, it is determined that FL=0 and the program is exited.

In this way, according to the embodiment of the invention, in case the absolute value |θp−θpc| of the difference between the braking operation quantity θp and the corrected braking operation quantity value θpc satisfies the condition α≧|θp−θpc|≧β, braking control is executed based on the corrected braking operation quantity value θpc. Thus, when the driver has made unnecessary braking in an attempt to stop the vehicle at a predetermined target position, it is possible to smoothly stop the vehicle at the stop position without causing unnecessary acceleration/deceleration or causing any discomfort on a passenger.

In the case of hard braking or in case the absolute value |θp−θpc of the difference between the braking operation quantity θp and the corrected braking operation quantity value θpc is large, the driver's braking is given a first priority, thus offering control that is stable and reliable at the same time.

Further, the corrected target stop position Ltc is learned by a learning value LL so as to approach the driver's braking feel. This is a control with usefulness that causes no discomfort on the driver.

While parameters such as a braking operation quantity are obtained focusing on a general braking distance in the exemplary embodiment, such parameters may be obtained using values corrected in consideration of a change in the coefficient of road surface friction or a change in the vehicle weight.

In the braking control that is based on the corrected braking operation quantity value θpc, the braking force of front wheels may be relaxed and that of the rear wheels may be increased to offset the nose dive at stoppage in order to ensure comfort at braking. The braking force of rear wheels may be canceled after the braking force of front wheels is canceled when the driver cancels braking after the vehicle is stopped.

What is claimed is:

1. A vehicle braking control device comprising:
   stop position candidate recognition means for recognizing stop position candidates for a vehicle stop position;
   braking operation quantity detection means for detecting a braking operation quantity;
   vehicle speed detection means for detecting a vehicle speed;
   target stop position setting means for setting a target stop position to stop a vehicle from the stop position candidates, based on the braking operation quantity and the vehicle speed;
   braking control quantity setting means for setting a braking control quantity to stop the vehicle based on the target stop position and the vehicle speed; and
   braking control execution means for executing braking control with the braking control quantity in case the braking operation quantity is a value in an area preset with respect to the braking control quantity;
   the target stop position setting means determines a braking distance based on the current braking operation quantity and vehicle speed and sets one of the stop position candidates that is closest to an end of the braking distance as the target stop position.

2. The vehicle braking control device according to claim 1, the braking control quantity setting means sets a corrected target stop position closer to the vehicle with respect to the target stop position by a preset correction value and sets as the braking control quantity a braking operation quantity necessary for stopping the vehicle at the corrected target stop position.

3. The vehicle braking control device according to claim 2, wherein the preset correction value used to determine the corrected target stop position is learned and updated in case a preset condition holds.

4. The vehicle braking control device according to claim 1, wherein the stop position candidates include white line data and a three-dimensional object.

5. The vehicle braking control device according to claim 2, wherein the braking control quantity setting means measures a distance to the target stop position as the preset correction value in case the vehicle stops before the target stop position by the braking operation quantity, and corrects the target stop position by the preset correction value to obtain the corrected target stop position.

* * * * *